US012304332B2

(12) United States Patent
Ryu (10) Patent No.: US 12,304,332 B2
(45) Date of Patent: May 20, 2025

(54) METHOD AND APPARATUS FOR DRIVING FUEL CELL-BASED VEHICLE (71) Applicants: Hyundai Motor Company, Seoul (KR); Kia Corporation, Seoul (KR)

(72) Inventor: Tae Woo Ryu, Pohang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 89 days.

(21) Appl. No.: 17/975,278

(22) Filed: Oct. 27, 2022

(65) Prior Publication Data

US 2023/0264580 A1 Aug. 24, 2023

(30) Foreign Application Priority Data

Feb. 22, 2022 (KR) .................. 10-2022-0023240

(51) Int. Cl.
*B60L 50/75* (2019.01)
*B60L 58/40* (2019.01)
*H01M 8/0438* (2016.01)
*H01M 8/04537* (2016.01)
*H01M 16/00* (2006.01)

(52) U.S. Cl.
CPC ............... *B60L 50/75* (2019.02); *B60L 58/40* (2019.02); *H01M 8/04425* (2013.01); *H01M 8/04567* (2013.01); *H01M 8/04574* (2013.01); *H01M 8/04626* (2013.01); *H01M 16/006* (2013.01); *H01M 2250/20* (2013.01)

(58) Field of Classification Search
CPC .... B60L 50/75; B60L 58/40; H01M 8/04425; H01M 8/04567; H01M 8/04574; H01M 8/04626; H01M 16/006; H01M 2250/20
See application file for complete search history.

(56) References Cited

U.S. PATENT DOCUMENTS

| 10,889,195 B2 | 1/2021 | Tsuruta | |
| 2004/0076860 A1* | 4/2004 | Aso | H01M 8/04388 429/430 |
| 2008/0087479 A1* | 4/2008 | Kang | H01M 8/0494 180/65.31 |

(Continued)

FOREIGN PATENT DOCUMENTS

| JP | 2019-170112 A | 10/2019 |
| KR | 10-0837939 B | 6/2008 |

(Continued)

OTHER PUBLICATIONS

"DC motor differential equation—Electrical Engineering Stack Exchange"_https://electronics.stackexchange.com/questions/325607/dcmotor-differential-equation.

(Continued)

*Primary Examiner* — Adam A Arciero (74) *Attorney, Agent, or Firm* — Morgan, Lewis & Bockius LLP (57) ABSTRACT A method of driving a fuel cell-based vehicle may include determining whether the vehicle is in an ignition entry state, determining an open-circuit voltage of a battery that provides a voltage to the air compressor based on the vehicle being in the ignition entry state, determining a drive current provided to the air compressor from the battery based on the open-circuit voltage, and driving the air compressor based on the drive current.

8 Claims, 9 Drawing Sheets (56) References Cited

U.S. PATENT DOCUMENTS

| | | |
|---|---|---|
| 2010/0133029 A1 | 6/2010 | Moran et al. |
| 2016/0288666 A1 | 10/2016 | Kim et al. |
| 2019/0288307 A1* | 9/2019 | Kim .................... H01M 10/44 |
| 2019/0291598 A1 | 9/2019 | Tsuruta |
| 2020/0148075 A1 | 5/2020 | Op De Beeck et al. |
| 2021/0162885 A1 | 6/2021 | Braun |

FOREIGN PATENT DOCUMENTS

| | | |
|---|---|---|
| KR | 10-1703590 B | 2/2017 |
| KR | 10-1826992 B | 2/2018 |

OTHER PUBLICATIONS

"Electromechanical Systems—Motors_ 7.5.1 Permanent Magnet DC Motors" _http://engineeronadisk.com/V2/book_modelling/engineeronadisk-65.html.

* cited by examiner

METHOD AND APPARATUS FOR DRIVING FUEL CELL-BASED VEHICLE

CROSS-REFERENCE TO RELATED APPLICATION

The present application claims priority to Korean Patent Application No. 10-2022-0023240, filed on Feb. 22, 2022, the entire contents of which is incorporated herein for all purposes by this reference.

BACKGROUND OF THE PRESENT DISCLOSURE

Field of the Present Disclosure

The present disclosure relates to an apparatus and method for driving a fuel cell-based vehicle.

Description of Related Art

A fuel cell-based vehicle operates driving devices of the vehicle using energy generated by fuel cells. The fuel cells generate electricity using a chemical reaction between hydrogen and oxygen.

To provide air to the fuel cells, the air compressor draws in air from the outside thereof, compresses the air, and provides the air to the fuel cells. That is, the air compressor that provides air to the fuel cells needs to be performed in advance to smoothly start the fuel cells. The air compressor is driven by a voltage applied from a battery, and when a voltage drop of the battery occurs, the air compressor is not driven smoothly. The failure to drive the air compressor causes problems leading to failure in ignition.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and an apparatus of driving a fuel cell-based vehicle to resolve ignition failure.

Various aspects of the present disclosure are directed to providing a method and apparatus of driving a fuel cell-based vehicle to resolve ignition failure of the vehicle while preventing the response speed of driving devices from being delayed while driving of the vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method of driving a fuel cell-based vehicle includes determining whether the vehicle is in an ignition entry state, determining an open-circuit voltage of a battery that provides a voltage to the air compressor based on the vehicle being in the ignition entry state, determining a drive current provided to the air compressor from the battery based on the open-circuit voltage, and driving the air compressor based on the drive current.

The determining of whether the vehicle is in the ignition entry state may include identifying an ignition-on signal of the vehicle, and identifying that the vehicle is in the ignition entry state based on the duration of the ignition-on signal being less than a threshold time period.

The determining of whether the vehicle is in the ignition entry state may further include identifying the RPM of the air compressor in response to the ignition-on signal, and counting the duration of the ignition-on signal when the fuel cell controller concludes that the RPM of the air compressor is zero.

The determining of the open-circuit voltage may include searching a look-up table in which a state of charge (SOC) value of the battery is matched with a magnitude of the open-circuit voltage.

The determining of the drive current may include reducing a magnitude of the drive current to reduce a voltage drop of the open-circuit voltage caused by the drive current.

The determining of the drive current may include setting an amount of reduction in the drive current to be larger as a magnitude of the open-circuit voltage decreases.

The determining of the drive current may include setting the drive current so that a magnitude obtained by subtracting the voltage drop caused by the drive current from the open-circuit voltage is greater than or equal to a minimum input voltage of a low voltage converter.

The driving of the air compressor may include accelerating an angular velocity of a motor that drives a fan of the air compressor during an acceleration interval based on the drive current, and maintaining a target angular velocity by adjusting a magnitude of the drive current after the acceleration interval.

The maintaining of the target angular velocity may include detecting the angular velocity of the motor and adjusting the magnitude of the drive current based on the angular velocity of the motor being reached a preset target angular velocity.

The method may further include determining a voltage magnitude of a supercapacitor that accumulates regenerative braking energy after the ignition entry state is determined and driving the air compressor based on the voltage of the supercapacitor when the voltage magnitude of the supercapacitor is greater than or equal to a preset threshold voltage.

According to an aspect of the present disclosure, an apparatus of driving a fuel cell-based vehicle includes a fuel cell stack including one or more unit cells for energy generation, an air compressor that supplies air to the fuel cell stack, a battery that provides electric power to the air compressor, a low voltage converter that boosts a voltage of the battery to a drive voltage of the air compressor, and a fuel cell controller that determines whether the vehicle is in an ignition entry state, determine an open-circuit voltage of the battery when the fuel cell controller concludes that the vehicle is in the ignition entry state, determines a drive current provided to the air compressor from the battery based on the open-circuit voltage and drives the air compressor based on the drive current.

The fuel cell controller may identify an ignition-on signal of the vehicle, and identify that the vehicle is in the ignition entry state based on the duration of the ignition-on signal being less than a threshold time period.

The fuel cell controller may identify the RPM of the air compressor in response to the ignition-on signal, and count the duration of the ignition-on signal when the fuel cell controller concludes that the RPM of the air compressor is zero.

The fuel cell controller may be configured to determine the open-circuit voltage by searching a look-up table in which a state of charge (SOC) value of the battery is matched with a magnitude of the open-circuit voltage.

The fuel cell controller may reduce a magnitude of the drive current to reduce a voltage drop of the open-circuit voltage caused by the drive current.

The fuel cell controller may set an amount of reduction in the drive current to be larger as a magnitude of the open-circuit voltage decreases.

The fuel cell controller may set the drive current so that a magnitude obtained by subtracting the voltage drop caused by the drive current from the open-circuit voltage is greater than or equal to a minimum input voltage of the low voltage converter that boosts the voltage of the battery.

The fuel cell controller may accelerate an angular velocity of a motor that drives a fan of the air compressor during an acceleration interval based on the drive current, and maintain a target angular velocity by adjusting a magnitude of the drive current after the acceleration interval.

The fuel cell controller may detect the angular velocity of the motor and adjust the magnitude of the drive current based on the angular velocity of the motor being reached a preset target angular velocity.

The apparatus may further include further including: a supercapacitor configured to accumulate regenerative braking energy, and the fuel cell controller may be configured to determine a voltage magnitude of the supercapacitor after the ignition entry state is determined, and drive the air compressor based on a voltage of the supercapacitor when the voltage magnitude of the supercapacitor is greater than or equal to a preset threshold voltage.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as including meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIG. 1, FIG. 2, FIG. 3, FIG. 4, FIG. 5, FIG. 6, FIG. 7, FIG. 8 and FIG. 9.

Figure 1:
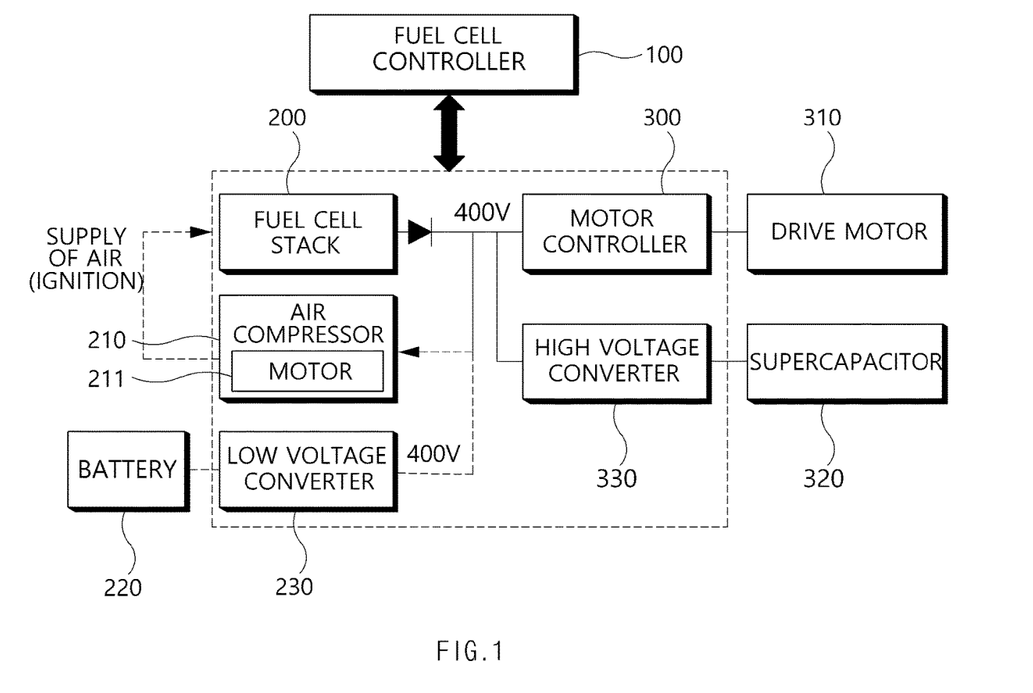
FIG. 1 is a diagram showing an apparatus of driving a fuel cell-based vehicle according to an exemplary embodiment of the present disclosure.

FIG. 1 is a diagram showing an apparatus of driving a fuel cell-based vehicle according to an exemplary embodiment of the present disclosure.

Referring to FIG. 1, the apparatus of driving a fuel cell-based vehicle according to an exemplary embodiment of the present disclosure may include a fuel cell controller 100, a fuel cell stack 200, an air compressor 210, a battery 220, a low voltage converter 230, a motor controller 300, a drive motor 310, a supercapacitor 320, and a high voltage converter 330.

The fuel cell controller 100 may correspond to a higher-level controller and may control driving devices. The fuel cell controller 100 according to the exemplary embodiment of the present disclosure may adjust a drive current to be provided from the battery 220 to the air compressor. The fuel cell controller 100 may reduce the voltage drop of the battery 220 by adjusting the drive current provided from the battery 220, thus preventing ignition failure phenomenon caused by the voltage drop. The fuel cell controller 100 may determine whether the vehicle is in an ignition entry state and adjust the drive current provided by the battery 220. The fuel cell controller 100 according to an exemplary embodiment of the present disclosure may control the drive current based on the vehicle being in the ignition entry state to reduce the drive current while the vehicle is being in the ignition entry state, thus preventing response speeds of the driving devices from being delayed.

In the fuel cell stack 200, chemical energy may be converted into electrical energy by an electrochemical reaction between fuel gas and oxygen. The fuel cell stack 200 may include one or more unit cells, and the unit cells may receive hydrogen gas contained in the fuel gas and air to induce oxidation and reduction reactions to generate electrical energy. The unit cell may include a membrane-electrode assembly (MEA) which is protected by an end plate from the outside thereof and oxidizes/reduces hydrogen gas, and at least one or more separators that supply fuel gas and air to the membrane-electrode assembly.

The air compressor 210 may supply compressed air to the fuel cell stack 200. To the present end, the air compressor 210 may include a motor 211 for rotating a fan.

The battery 220 may provide power for driving the motor 211 of the air compressor 210.

The low voltage converter 230 may boost a voltage of the battery 220 and provide the voltage to the motor 211. When receiving a voltage equal to or greater than the minimum input voltage, the low voltage converter 230 may boost the voltage of the battery 220 to a voltage capable of driving the motor 211.

The drive motor 310 may be operated by the motor controller 300 and drive a vehicle by receiving power from the fuel cell or the supercapacitor 320. Also, the drive motor 310 may provide power generated through regenerative braking to the supercapacitor 320.

The supercapacitor 320 may be charged by receiving power generated by the drive motor 310 operating as a generator during regenerative braking when the vehicle is braked. A voltage charged in the supercapacitor 320 may assist the output of the drive motor 310 and may be consumed to drive the air compressor 210 during ignition.

The high voltage converter 330 may boost the voltage charged in the supercapacitor 320 to a voltage required by the drive motor 310.

Figure 2:
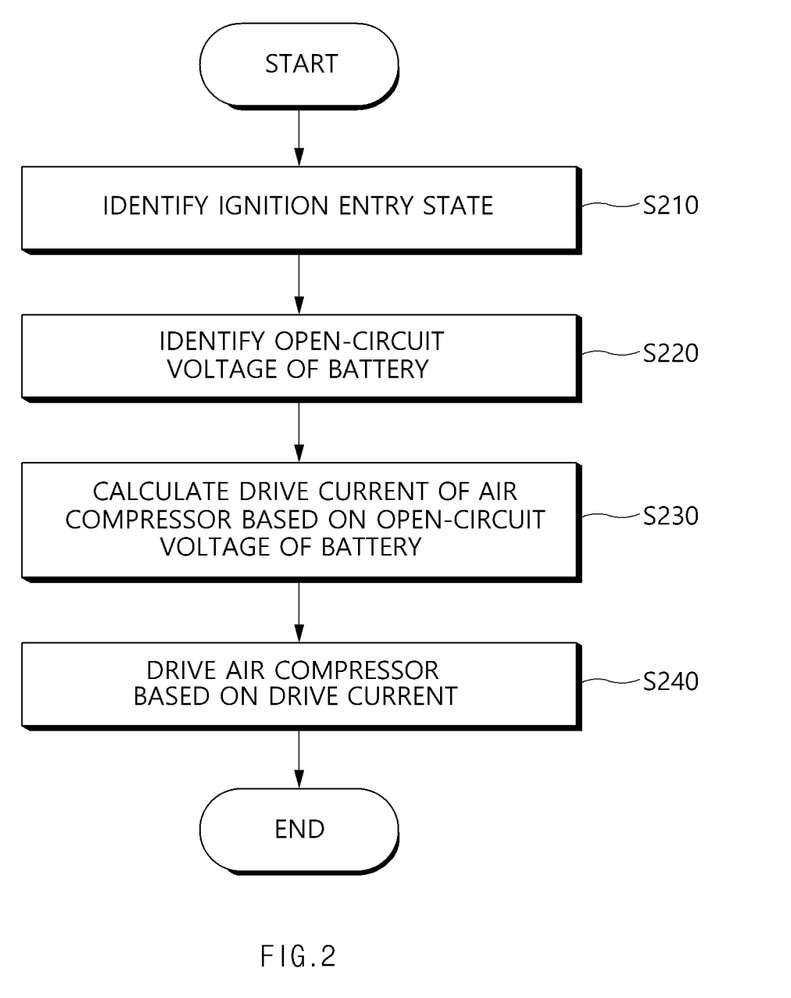
FIG. 2 is a flowchart for describing a method of driving a fuel cell-based vehicle according to an exemplary embodiment of the present disclosure.

FIG. 2 is a flowchart for describing a method of driving a fuel cell-based vehicle according to an exemplary embodiment of the present disclosure.

Referring to FIG. 2, according to the method of driving a fuel cell-based vehicle according to the exemplary embodiment of the present disclosure, in a first operation S210, the fuel cell controller 100 may determine whether the vehicle is in an ignition entry state. The operation of determining the ignition entry state may be an operation of identifying a time point at which a vehicle is switched from an ignition-off state to an ignition-on state.

In a second operation S220, the fuel cell controller 100 may determine an open-circuit voltage (OCV) of the battery 220 providing electric power to the air compressor 210 based on the vehicle being in an ignition entry state. The open-circuit voltage of the battery 220 may be determined based on a state of charge (hereinafter, referred to as SOC). The open-circuit voltage of the battery 220 may vary according to the SOC, and may decrease over time. The magnitude of the open-circuit voltage may be matched with the SOC value of the battery 220 in advance and stored in a form of a lookup table. [Table 1] below is a table showing an example of an open-circuit voltage matching the SOC value of the battery 220.

TABLE 1

| SOC[%] | OCV[V] |
|---|---|
| 100 | 12 |
| 90 | 11 |
| 80 | 10 |
| 70 | 9 |
| 60 | 8 |
| 50 | 7 |
| 40 | 6 |
| 30 | 5 |
| 20 | 4 |
| 10 | 3 |
| 0 | 2 |

The fuel cell controller 100 may detect the SOC value of the battery 220 and search for an open-circuit voltage corresponding to the detected SOC from the lookup table.

In a third operation S230, the fuel cell controller 100 may determine the magnitude of a drive current provided to the air compressor 210 based on the open-circuit voltage. The drive current may refer to a current provided to the air compressor 210 by the battery 220. The fuel cell controller 100 may reduce the magnitude of the drive current to reduce the magnitude of the voltage drop of the open-circuit voltage, which is caused by a drive current.

When the magnitude of the voltage drop caused by the drive current is large, the voltage of the battery 220 may be smaller than the minimum input voltage of the low voltage converter 230. That is, when the voltage drop of the battery 220 is large, the output voltage of the low voltage converter 230 may not be boosted to a voltage required by the air compressor 210. When the air compressor 210 does not receive the required voltage, the motor 211 may not be operated, and the fuel cell stack 200 operating with air provided from the air compressor 210 may not generate energy. That is, the driving of the vehicle may be disabled.

The fuel cell controller 100 according to an exemplary embodiment of the present disclosure may reduce the voltage drop of the battery 220 by reducing the magnitude of the drive current when the vehicle is in the ignition entry state. Because the voltage drop of the battery 220 is reduced, the low voltage converter 230 may stably maintain the voltage required by the air compressor 210. Therefore, the vehicle may be driven smoothly.

A more specific method of determining the magnitude of the drive current will be described later.

In a fourth operation S240, the air compressor 210 may be driven based on a drive current. The motor 211 of the air compressor 210 may rotate based on the drive current.

Hereinafter, operations shown in FIG. 2 will be described in more detail below.

Figure 3:
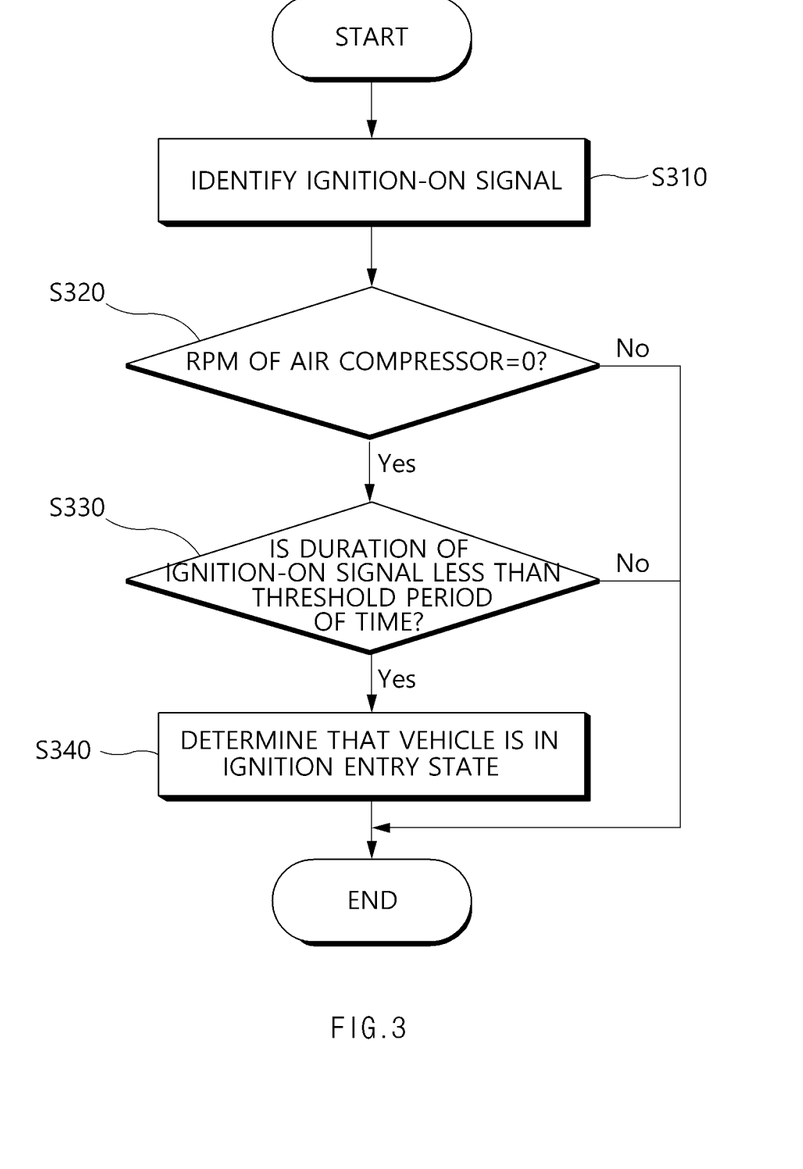
FIG. 3 is a flowchart for describing a method of determining an ignition entry state according to an exemplary embodiment of the present disclosure.

FIG. 3 is a flowchart for describing a method of determining an ignition entry state according to an exemplary embodiment of the present disclosure;

Referring to FIG. 3, in the method of determining an ignition entry state according to the exemplary embodiment of the present disclosure, in a first operation S310, the fuel cell controller 100 may identifying an ignition-on signal. The ignition-on signal may be a signal indicating a state in which a vehicle's engine is turned on. As an exemplary embodiment of the present disclosure, the ignition-on signal may be expressed as 1, and an ignition-off signal in a state in which the engine is turned off may be expressed as 0.

In a second operation S320, the fuel cell controller 100 may determine whether the air compressor 210 is rotating. That is, the fuel cell controller 100 may determine whether the RPM of the air compressor 210 is zero. The RPM of the air compressor 210 may be identified using a sensor such as a proximity sensor or an encoder.

In a third operation S330 and a fourth operation S340, the fuel cell controller 100 may identify the duration of the ignition-on signal when the air compressor does not rotate. During the duration of the ignition-on signal, the ignition-on signals may be counted using a counter, and the duration of the ignition-on signal may be determined according to the number of ignition-on signals.

The fuel cell controller 100 may determine that the vehicle is in the ignition entry state when the duration of the ignition-on signal is within a preset threshold time. The threshold time may be set to several seconds.

The second operation S220 to the fourth operation S240 described with reference to FIG. 2 indicate operation for driving the air compressor 210 using the battery 220. The operation of driving the air compressor 210 using the battery 220 is based on the ignition entry state, thus preventing a slow response of the driving system while driving of the vehicle.

The ignition-on signal may be maintained until the engine is turned off after the engine of the vehicle is turned on. Accordingly, when the magnitude of the drive current is simply reduced in response to the ignition-on signal, a response speed required for the air compressor 210 to rotate at a desired angular velocity may be slowed. When the response speed of the air compressor 210 is slowed, the overall driving of the vehicle may be slowed down. The response speed of the air compressor 210 may be described with reference to FIG. 4 below.

Figure 4:
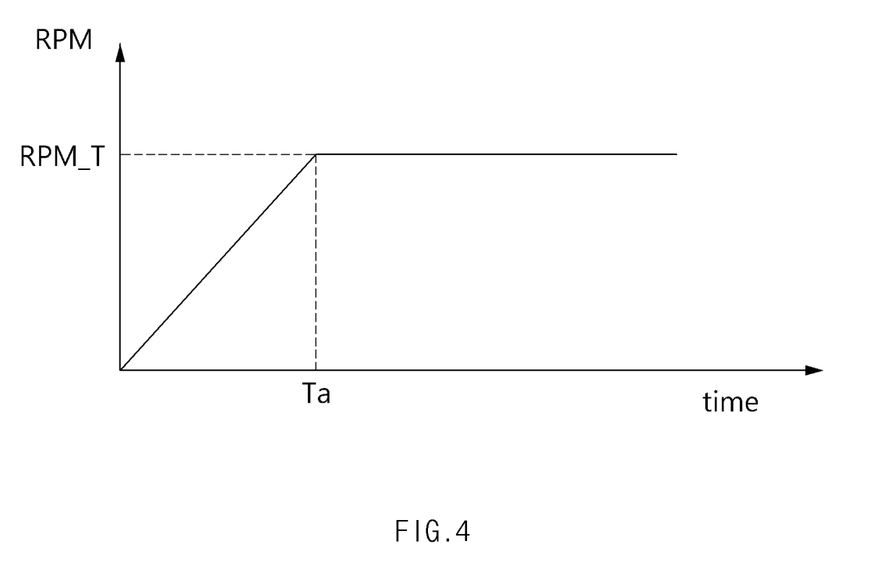
FIG. 4 is a diagram illustrating a change in RPM according to driving of a motor.

FIG. 4 is a diagram illustrating a change in RPM according to driving of a motor.

Referring to FIG. 4, the motor 211 of the air compressor 210 may be operated by the drive current when the RPM is zero, thus increasing the RPM. The RPM of the motor 211 may be schematically divided into an acceleration interval during which the angular velocity increases until the target RPM has been reached and an interval during which the angular velocity is maintained after the target RPM (RPM_T) has been reached. The acceleration interval may be an interval of from 0 to Ta.

The fuel cell controller 100 may detect the RPM of the motor 211 and adjust the magnitude of the drive current based on the detected RPM of the motor 211 having been reached a preset target RPM (RPM_T).

The torque of the motor 211 may be proportional to the magnitude of the drive current, and the RPM may increase in proportion to the torque. Accordingly, the change rate of the RPM of the motor 211 may be proportional to the magnitude of the drive current, and the acceleration interval may be reduced according to the magnitude of the drive current.

In the method illustrated in FIG. 2, it is possible to reduce the amount of the drive current in the ignition entry state to prevent the driving operation from being disabled. The driver may not be affected even when the driving of the vehicle is delayed for several seconds in the ignition entry state, but the driver may feel a great inconvenience when the response of the accelerator or the like is delayed while driving of the vehicle. Therefore, in the exemplary embodiment of the present disclosure, as shown in FIG. 3, the operations after the second operation S220 shown in FIG. 2 may be performed only when the ignition-on signal is within a predetermined time period.

A state in which the RPM of the motor 211 is not zero represents a state in which the vehicle is smoothly driven, and therefore, the operations after the second operation S220 illustrated in FIG. 2 may not be performed.

Figure 5:
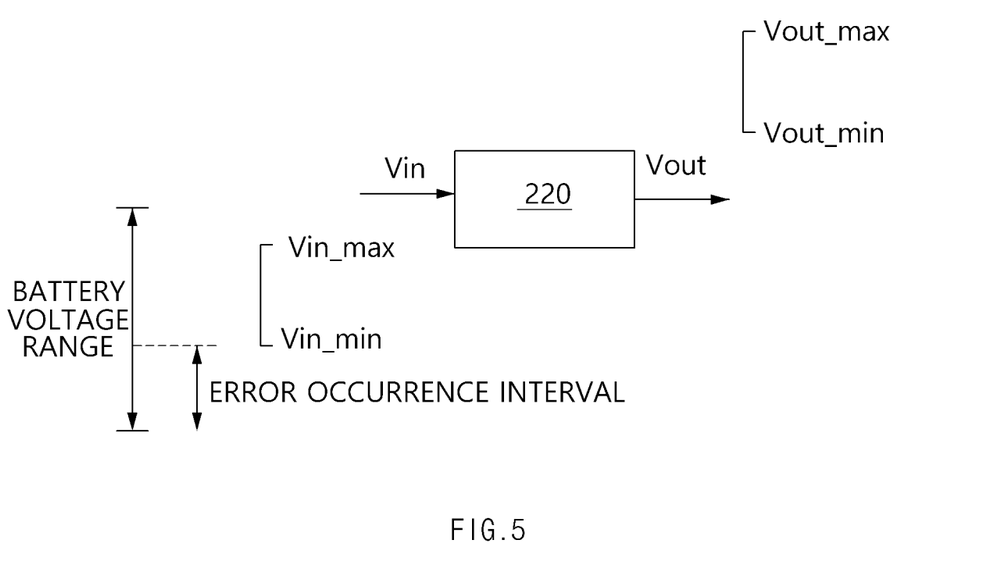
FIG. 5 is a diagram for describing a phenomenon in which an air compressor becomes inoperable due to voltage drop of a battery.

FIG. 5 is a diagram for describing a phenomenon in which an air compressor becomes inoperable due to voltage drop of a battery.

Referring to FIG. 5, the low voltage converter 230 may boost an input voltage Vin to provide an output voltage Vout to the motor 211 of the air compressor 210.

It is necessary that a minimum output voltage Vout min of the low voltage converter 230 is equal to or greater than the minimum voltage capable of driving the motor 211. Because the range of a voltage which the low voltage converter 230 is capable of boosting is determined according to the design specification, the magnitude of a minimum input voltage Vin_min may be also determined so that the minimum output voltage Vout min is reached to more than a predetermined voltage.

When the input voltage Vin of the low voltage converter 230 is less than the minimum input voltage Vin_min, the motor 211 may be disabled.

The input voltage Vin of the low voltage converter 230 may correspond to the voltage of the battery 220, and the voltage of the battery 220 may have a magnitude obtained by subtracting a voltage drop caused by a discharge current from an open-circuit voltage.

That is, the voltage of the battery 220 may be defined by the following [Equation 1].

$$V = OCV - IR \qquad \text{[Equation 1]}.$$

In [Equation 1], "V" is a voltage of the battery 220, OCV is an open-circuit voltage of the battery 220, "I" is a discharge current of the battery 220, and "R" is an internal resistance of the battery. The discharge current "I" is a current flowing from the battery 220 to the low voltage converter 230, and may refer to a drive current received by the low voltage converter 230.

As shown in [Equation 1], a voltage drop may occur in the battery 220 in proportion to the discharge current and the internal resistance. Because the voltage of the battery 220 decreases as the discharge current increases, the voltage of the battery 220 may be lower than the minimum input voltage Vin_min of the low voltage converter 230 when the voltage of the battery 220 is at a certain level.

In an exemplary embodiment of the present disclosure, to prevent the low voltage converter 230 from being inoperable due to a voltage drop of the battery 220, the discharge current of the battery 220 may be adjusted such that the voltage of the battery 220 is to be equal to or greater than the minimum input voltage Vin_min of the low voltage converter 230. The minimum input voltage Vin_min of the low voltage converter 230 may be pre-designed in the specification.

An exemplary embodiment of controlling the discharge current of the battery 220 will be described below.

Figure 6:
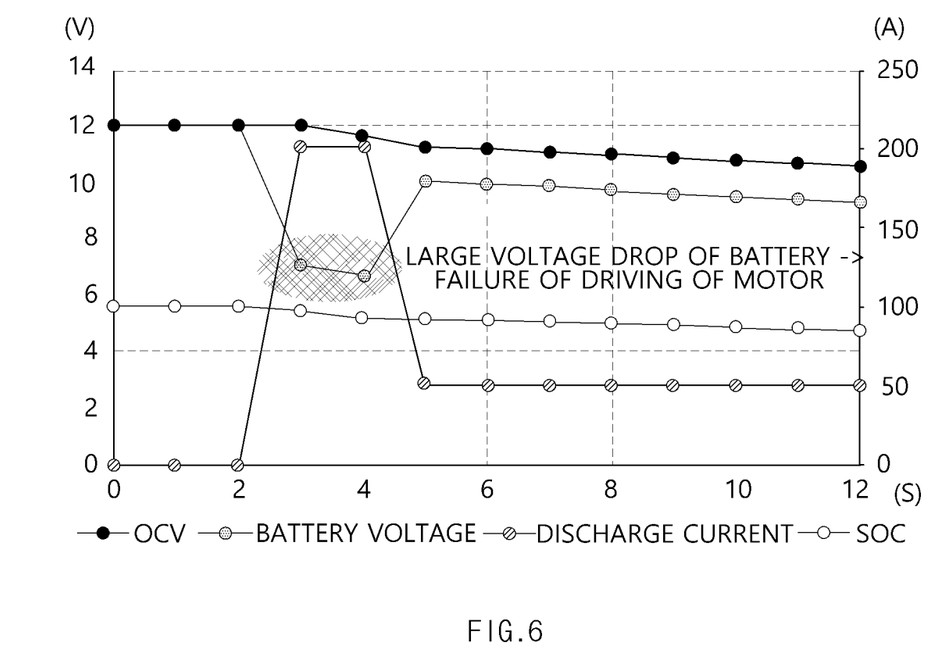
FIG. 6 is a diagram for describing a battery voltage drop according to a comparative example.
Figure 7:
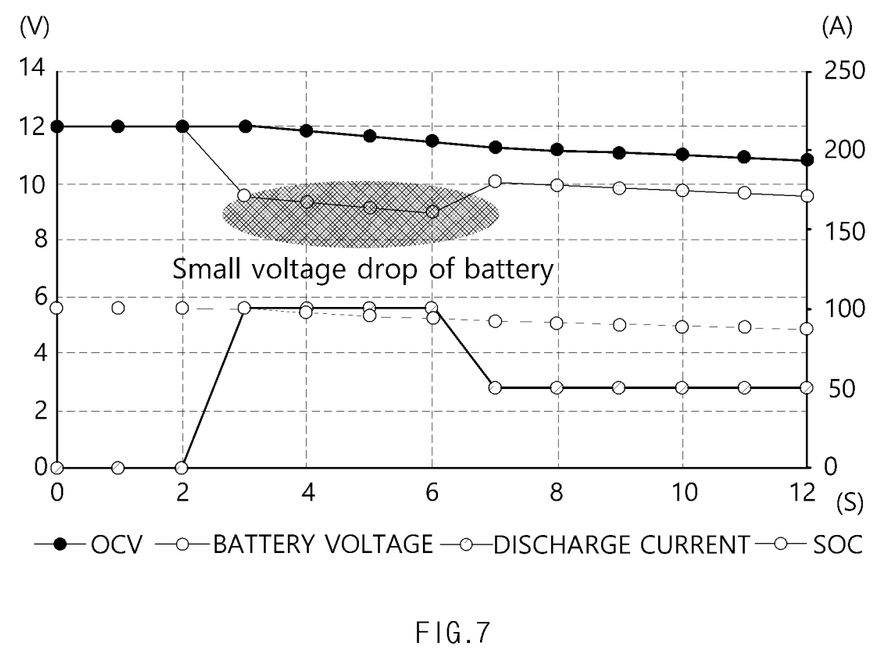
FIG. 7 is a diagram for describing a battery voltage drop according to an exemplary embodiment of the present disclosure.

FIG. 6 and [Table 2] show simulation results for describing a battery voltage drop according to comparative examples, and FIG. 7 and [Table 3] show simulation results for describing a battery voltage drop according to various exemplary embodiments of the present disclosure.

FIG. 6 and FIG. 7 and [Table 2] and [Table 3] are results of experiments based on a battery having an internal resistance of 0.025 (Ω) and a battery capacity of 1.5 (Ah). The low voltage converter 230 is a result of using a converter having a minimum input voltage of about 8.5V.

TABLE 2

| Time[s] | OCV[V] | Discharge current[A] | Battery voltage[V] | SOC[%] | Cell capacity[Ah] |
|---|---|---|---|---|---|
| 0 | 12 | 0 | 12 | 100 | 1.5 |
| 1 | 12 | 0 | 12 | 100 | 1.5 |
| 2 | 12 | 0 | 12 | 100 | 1.5 |
| 3 | 12 | 200 | 7 | 96.2963 | 1.44444 |
| 4 | 11.62963 | 200 | 6.62963 | 92.59259 | 1.38889 |
| 5 | 11.25926 | 50 | 10.00926 | 91.66667 | 1.375 |
| 6 | 11.16667 | 50 | 9.916667 | 90.74074 | 1.36111 |
| 7 | 11.07407 | 50 | 9.824074 | 89.81481 | 1.34722 |
| 8 | 10.98148 | 50 | 9.731481 | 88.88889 | 1.33333 |
| 9 | 10.88889 | 50 | 9.638889 | 87.96296 | 1.31944 |
| 10 | 10.7963 | 50 | 9.546296 | 87.03704 | 1.30556 |
| 11 | 10.7037 | 50 | 9.453704 | 86.11111 | 1.29167 |
| 12 | 10.61111 | 50 | 9.361111 | 85.18519 | 1.27778 |

Referring to FIG. 6 and [Table 2], an interval of from 3 second to 4 second may be an acceleration interval. It may be seen that the voltage of the battery 220 is lowered to 7V due to the voltage drop caused by the discharge current of the battery 220 at the time point of 3 second. That is, because the voltage of the battery 220 is lower than 8.5V, which is the minimum input voltage Vin_min of the low voltage converter 230, the low voltage converter may become inoperable and the subsequent operation sequence may be terminated. That is, the air compressor 210 may not operate due to the inoperability of the low voltage converter 230, and all subsequent driving operations of the vehicle may be terminated, thus leading to failure of ignition. Referring back to FIG. 6 and Table 2, the discharge current and battery voltage after 4 second may refer to exemplary values obtained by determination.

On the other hand, referring to FIG. 7 and [Table 3], an exemplary embodiment of the present disclosure will be described below.

TABLE 3

| Time [s] | OCV [V] | Discharge current [A] | Battery voltage [V] | SOC [%] | Cell capacity [Ah] |
|---|---|---|---|---|---|
| 0 | 12 | 0 | 12 | 100 | 1.5 |
| 1 | 12 | 0 | 12 | 100 | 1.5 |
| 2 | 12 | 0 | 12 | 100 | 1.5 |
| 3 | 12 | 100 | 9.5 | 98.14815 | 1.472222 |
| 4 | 11.81481 | 100 | 9.314815 | 96.2693 | 1.444444 |
| 5 | 11.62963 | 100 | 9.12963 | 92.59259 | 1.416667 |
| 6 | 11.44444 | 100 | 8.944444 | 91.66667 | 1.388889 |
| 7 | 11.25926 | 50 | 10.00926 | 90.74074 | 1.375 |
| 8 | 11.16667 | 50 | 9.916667 | 89.81481 | 1.361111 |
| 9 | 11.07407 | 50 | 9.824074 | 88.88889 | 1.347222 |
| 10 | 10.98148 | 50 | 9.731481 | 87.96296 | 1.333333 |

TABLE 3-continued

| Time [s] | OCV [V] | Discharge current [A] | Battery voltage [V] | SOC [%] | Cell capacity [Ah] |
|---|---|---|---|---|---|
| 11 | 10.88889 | 50 | 9.638889 | 87.03704 | 1.319444 |
| 12 | 10.7963 | 50 | 9.546296 | 86.11111 | 1.305556 |

The fuel cell controller 100 according to an exemplary embodiment of the present disclosure may adjust the discharge current of the battery 220 such that the voltage of the battery 220 is to be equal to or greater than the minimum input voltage Vin_min of the low voltage converter 230. FIG. 7 and [Table 3] show an exemplary embodiment in which the voltage of the battery 220 is set to 9V.

As shown in FIG. 7 and [Table 3], it may be seen that the voltage of the battery 220 actually measured by the discharge current in the acceleration interval after 3 second is close to 9V when the determined battery voltage is 9V. Accordingly, the voltage of the battery 220 may be maintained at a value greater than the minimum input voltage Vin_min of the low voltage converter 230, thus making it possible to start the vehicle smoothly.

Figure 8:
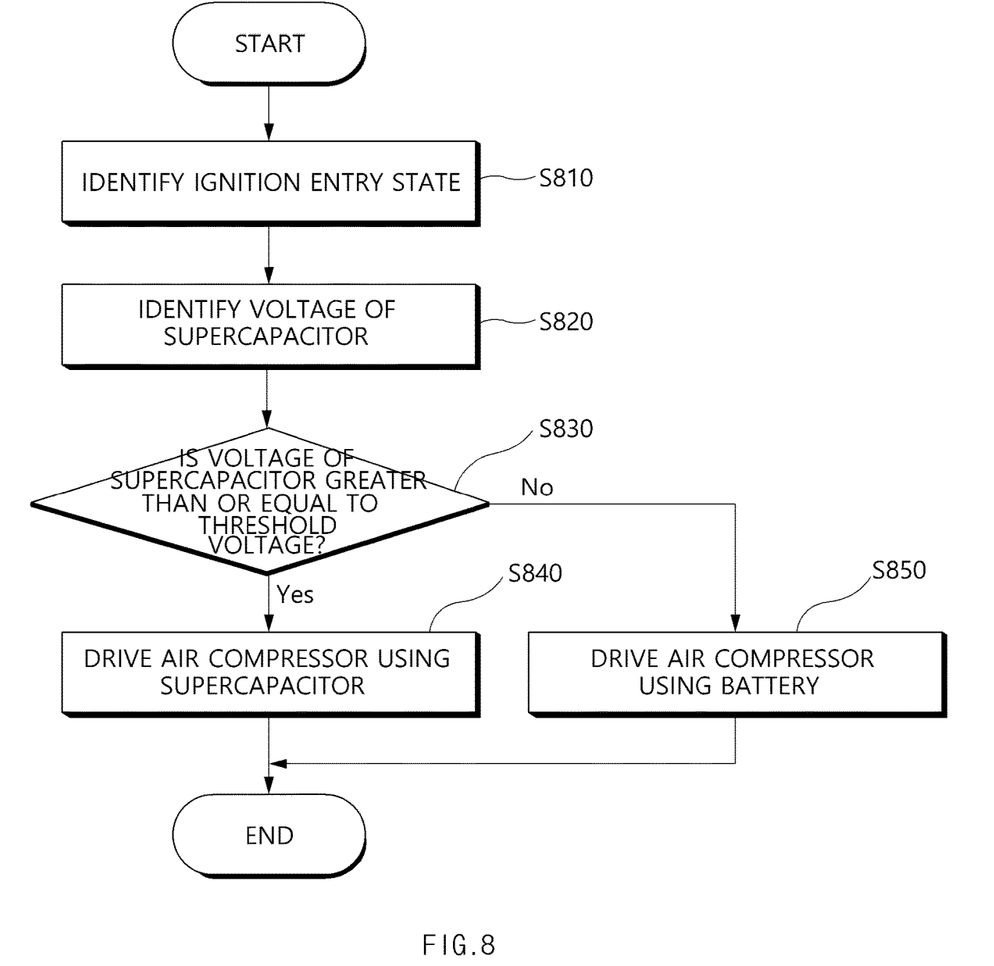
FIG. 8 is a flowchart for describing a method of driving a fuel cell-based vehicle according to another exemplary embodiment of the present disclosure.

FIG. 8 is a flowchart for describing a method of driving a fuel cell-based vehicle according to another exemplary embodiment of the present disclosure; and Referring to FIG. 8, in a first operation S810, the fuel cell controller 100 may identify an ignition entry state. The first operation S810 may be identical to the first operation S210 shown in FIG. 2.

In a second operation S820, the fuel cell controller 100 may identify a voltage of the supercapacitor 320.

In a third step S830, the fuel cell controller 100 may determine whether the voltage of the supercapacitor 320 is equal to or greater than a preset threshold voltage. The threshold voltage may be greater than or equal to the minimum voltage capable of driving the air compressor 210, and may be set within a range of being less than the maximum voltage of the supercapacitor 320.

In a fourth operation S840, the fuel cell controller 100 may drive the air compressor 210 based on power stored in the supercapacitor 320 based on the voltage of the supercapacitor 320 being equal to or greater than the threshold voltage.

In a fifth operation S850, the fuel cell controller 100 may drive the air compressor 210 using the battery based on the voltage of the supercapacitor 320 being less than the threshold voltage. The fifth operation S850 may include the second operation S220, the third operation S230, and the fourth operation S240 illustrated in FIG. 2.

According to the exemplary embodiment shown in FIG. 8, the fuel cell controller 100 does not use the battery 220 based on the determination that the voltage of the supercapacitor 320 is capable of driving the air compressor 210, and then does not use the low voltage converter 230 for boosting the voltage of the battery 220. As a result, in a process of driving the air compressor 210, it is possible to prevent a malfunction of the low voltage converter 230 due to a voltage drop of the battery 220.

Figure 9:
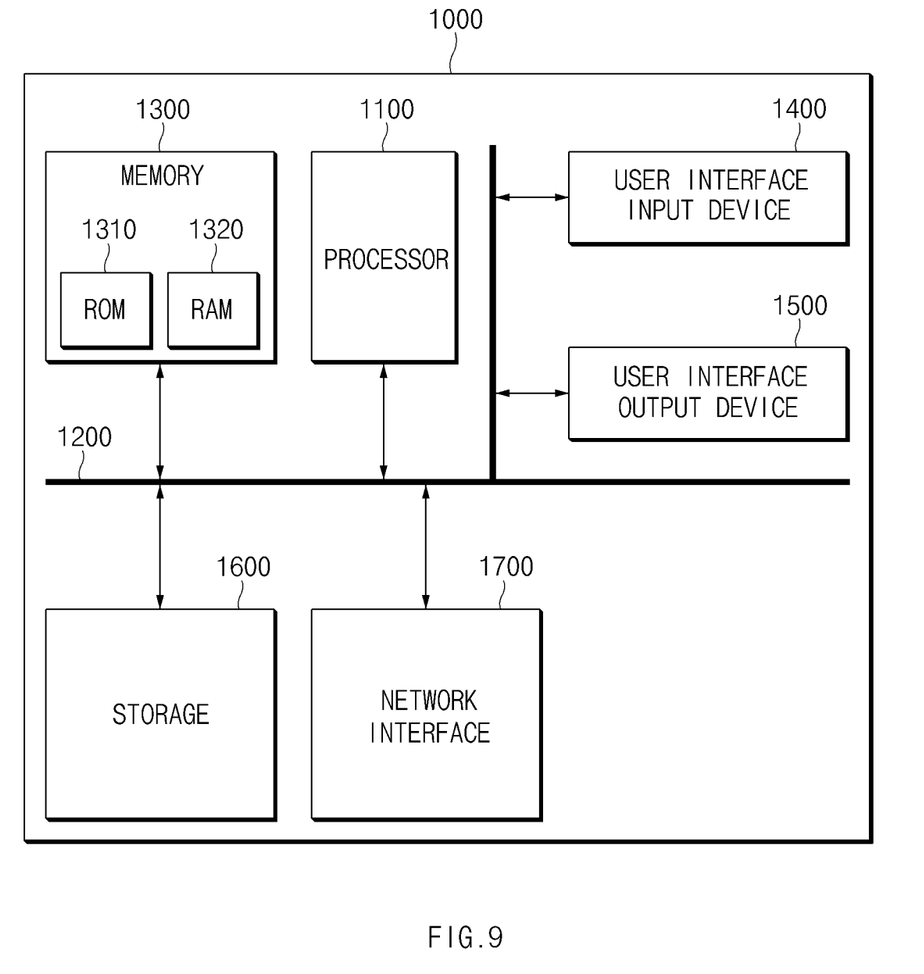
FIG. 9 is a diagram illustrating a computing system according to an exemplary embodiment of the present disclosure.

FIG. 9 is a diagram illustrating a computing system according to an exemplary embodiment of the present disclosure.

Referring to FIG. 9, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The processor 1100 may include the fuel cell controller 100 according to an exemplary embodiment of the present disclosure.

The memory 1300 and the storage 1600 may include various types of volatile or non-volatile storage media. For example, the memory 1300 may include a Read Only Memory (ROM) and a Random Access Memory (RAM).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor and the storage medium may reside in the user terminal as separate components.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The exemplary embodiments of the present disclosure may reduce the voltage drop of the battery by adjusting the drive current provided from the battery, thus preventing the motor of the air compressor from becoming inoperable.

Furthermore, the exemplary embodiments of the present disclosure may adjust the drive current provided from the battery based on identification of the ignition entry state, thus preventing the response speed of the driving devices from being delayed because the drive current is lowered during the driving of the vehicle.

Furthermore, various effects may be provided that are directly or indirectly understood through the present disclosure.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of driving a fuel cell-based vehicle, the apparatus comprising:
   a fuel cell stack including one or more unit cells for energy generation;
   an air compressor configured to supply air to the fuel cell stack;
   a battery electrically connected to the air compressor and configured to provide electric power to the air compressor;
   a converter electrically connected to the battery and configured to boost a voltage of the battery to a drive voltage of the air compressor;
   a memory storing a lookup table in which a state of charge (SOC) value of the battery is matched with a magnitude of the open-circuit voltage; and
   a fuel cell controller configured to determine whether the vehicle is in an ignition entry state, determine an open-circuit voltage of the battery by searching the lookup table when the fuel cell controller concludes that the vehicle is in the ignition entry state, determine a drive current provided to the air compressor from the battery based on the open-circuit voltage and drive the air compressor based on the drive current,
   wherein the fuel cell controller is further configured to set the drive current so that a magnitude obtained by subtracting a voltage drop caused by the drive current from the open-circuit voltage is greater than or equal to a minimum input voltage of the converter.

2. The apparatus of claim 1, wherein in determining whether the vehicle is in the ignition entry state, the fuel cell controller is configured to:
   identify an ignition-on signal of the vehicle;
   count a duration of the ignition-on signal when the fuel cell controller concludes that a revolutions per minute (RPM) of the air compressor is zero; and
   identify that the vehicle is in the ignition entry state when the fuel cell controller concludes that the duration of the ignition-on signal is less than a threshold time period.

3. The apparatus of claim 2, wherein the fuel cell controller is further configured to:
   identify the RPM of the air compressor in response to the ignition-on signal,
   count the duration of the ignition-on signal based on the RPM of the air compressor being zero, and
   identify that the vehicle is in the ignition entry state based on the duration of the ignition-on signal being greater than or equal to the threshold time period.

4. The apparatus of claim 1, wherein in the determining of the drive current, the fuel cell controller is configured to reduce a magnitude of the drive current to reduce the voltage drop of the open-circuit voltage caused by the drive current.

5. The apparatus of claim 4, wherein in the determining of the drive current, the fuel cell controller is further configured to set an amount of reduction in the drive current to be larger as a magnitude of the open-circuit voltage decreases.

6. The apparatus of claim 1, wherein the fuel cell controller is further configured to:
   accelerate an angular velocity of a motor that drives a fan of the air compressor based on the drive current during an acceleration interval; and
   drive the air compressor to maintain a level of angular velocity of the motor by adjusting a magnitude of the drive current after the acceleration interval.

7. The apparatus of claim 6, wherein the fuel cell controller is further configured to:
   detect an RPM of the motor, and
   adjust the magnitude of the drive current based on the RPM of the motor being reached a preset target RPM.

8. The apparatus of claim 1, further including:
   a supercapacitor configured to accumulate regenerative braking energy,
   wherein the fuel cell controller is configured to determine a voltage magnitude of the supercapacitor after the fuel cell controller concludes that the vehicle is in the ignition entry state and drive the air compressor based on the voltage magnitude of the supercapacitor when the fuel cell controller concludes that the voltage magnitude of the supercapacitor is greater than or equal to a preset threshold voltage.

* * * * *